United States Patent [19]

Frank et al.

[11] 4,072,411
[45] Feb. 7, 1978

[54] DISPLAY DEVICE HAVING IMAGE SENSE REVERSAL CAPABILITY

[75] Inventors: Lee Fitzpatrick Frank; Joseph Yorks Kaukeinen, both of Rochester, N.Y.

[73] Assignee: Eastman Kodak Company, Rochester, N.Y.

[21] Appl. No.: 682,304

[22] Filed: May 3, 1976

[51] Int. Cl.² .................................................. G03B 21/00
[52] U.S. Cl. ..................................... 353/121; 353/77; 353/122; 350/356
[58] Field of Search .............. 350/160 R, 160 P, 161; 353/77, 121, 122; 355/3 SC, 3 P, 5

[56] References Cited

U.S. PATENT DOCUMENTS

| | | | |
|---|---|---|---|
| 2,290,581 | 7/1942 | Donal | 358/231 |
| 2,457,981 | 1/1949 | De Forest | 313/465 |
| 3,100,817 | 8/1963 | Rosendahl | 350/161 P |
| 3,257,903 | 6/1966 | Marks | 350/267 |
| 3,485,621 | 12/1969 | Kazan | 96/1 R |
| 3,512,876 | 5/1970 | Marks | 350/267 |
| 3,527,525 | 9/1970 | Marks | 350/267 |
| 3,592,527 | 7/1971 | Conners | 350/160 R |
| 3,732,007 | 5/1973 | Kushima et al. | 355/5 |
| 3,833,294 | 9/1974 | Kessler | 353/27 A |

*Primary Examiner*—Harry N. Haroian
*Attorney, Agent, or Firm*—John D. Husser

[57] ABSTRACT

An improved display device utilizes an electro-optical panel including an electrically insulating layer and a light-modulating layer of dipole, light control particles dispersed in a transparent matrix. An imaging electric charge pattern is impressed on the panel to establish a particle orienting field thereacross. The light modulating pattern thus created in the modulating layer is selectively changed between positive and negative image sense by selective application and removal of a uniform field of the same polarity as, but lesser magnitude than, the imaging charge pattern. The stored image pattern is erasable by application of a reverse polarity field. Preconditioning the panel with a uniform field facilitates a positive light modulating pattern in the first instance.

21 Claims, 6 Drawing Figures

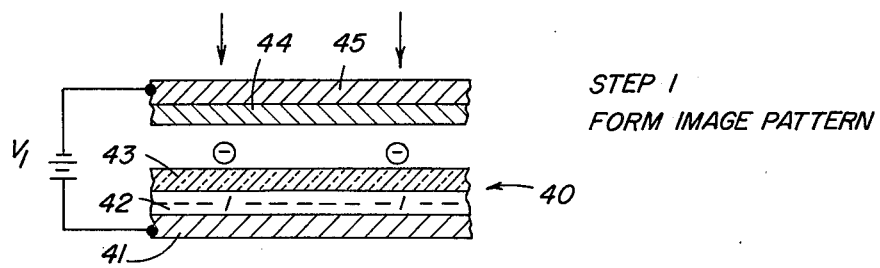
STEP 1
FORM IMAGE PATTERN
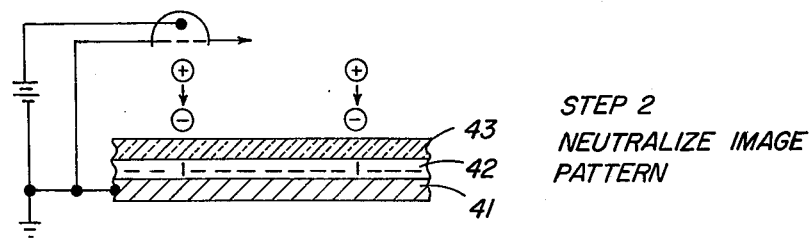
STEP 2
NEUTRALIZE IMAGE PATTERN
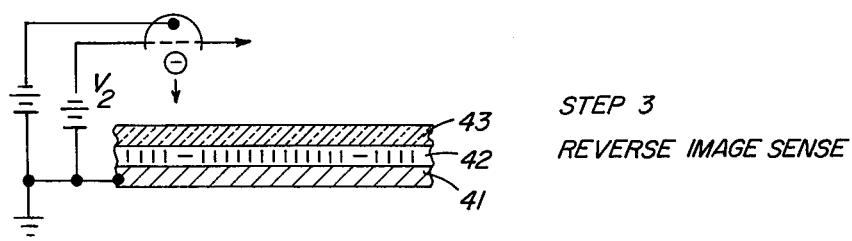
STEP 3
REVERSE IMAGE SENSE
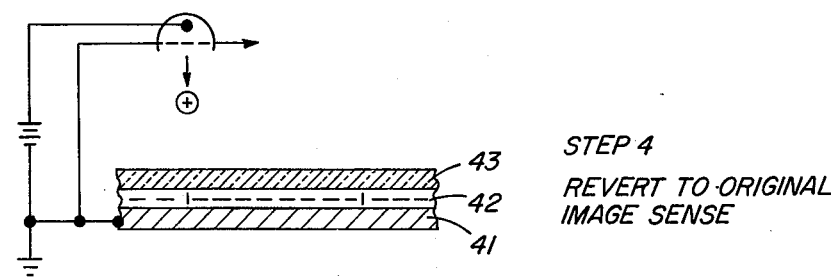
STEP 4
REVERT TO ORIGINAL IMAGE SENSE

DISPLAY DEVICE HAVING IMAGE SENSE REVERSAL CAPABILITY

CROSS REFERENCE TO RELATED APPLICATIONS

Reference is made herein to commonly assigned U.S. application Ser. No. 682,305, entitled "Improved Active Light Control Device" and filed concurrently herewith in the names of Joseph Y. Kaukeinen and Lee F. Frank.

BACKGROUND OF INVENTION

1. Field of Invention

The present invention relates to improved image display apparatus of the active type and more particularly to such apparatus having a unique capability for selectively reversing the reproduction sense of a displayed image.

2. Description of Prior Art

Present day information storage and retrieval systems include media for storing information in both positive and negative format, i.e., "positive format" being generally utilized in reference to the same image-sense as the original (dark portions of the original are dark and light portions light in the storage media) and negative format being generally utilized in reference to the reverse image sense as the original (dark portions of the original are light and light portions dark in the storage medium).

Display terminals for such information systems generally produce images for viewing which are the same reproduction (or image) sense as on the storage medium. The prior approaches for providing image-sense reversal at a display terminal have been by and large impractical, unreliable and/or extremely expensive and thus have not received any great extent of commercial success.

However, the need for an image reversal capability for such display terminals continues to exist for a number of reasons. For example certain stored information on the storage medium may be more readily discerned by the viewer in one image sense, while other information on the medium is more readily discerned in the other image sense. Also the desired reproduction sense for hard copy output from the system may be opposite that which is most desirable to view. Additionally a subjective factor exists, in that some viewers simply "prefer" one reproduction sense display while others "prefer" the other sense; thus the flexibility to vary this aspect at will is attractive for such apparatus.

SUMMARY OF INVENTION

Thus, it is an object of the present invention to provide improved information display apparatus having a capability for selective reversal of the reproduction sense of displayed information.

A further object is to provide such apparatus which is readily fabricatable and simple in operation.

Yet another object of the present invention is to provide such apparatus with improved functional capabilities.

These objectives are achieved by providing for such apparatus a display panel containing field orientable light control particles and means for controlling the fields operative on such particles to effect an image display in either positive or negative format, selectively.

BRIEF DESCRIPTION OF DRAWINGS

In the subsequent more detailed description of the invention, reference is made to the attached drawings in which:

FIGS. 3A–3D are schematic views illustrating a simplified electro-optical element in accordance with the present invention with charge and particle orienting effects shown as envisioned by one theory of operation for the invention.

DETAILED DESCRIPTION OF PREFERRED EMBODIMENTS

Figure 1:
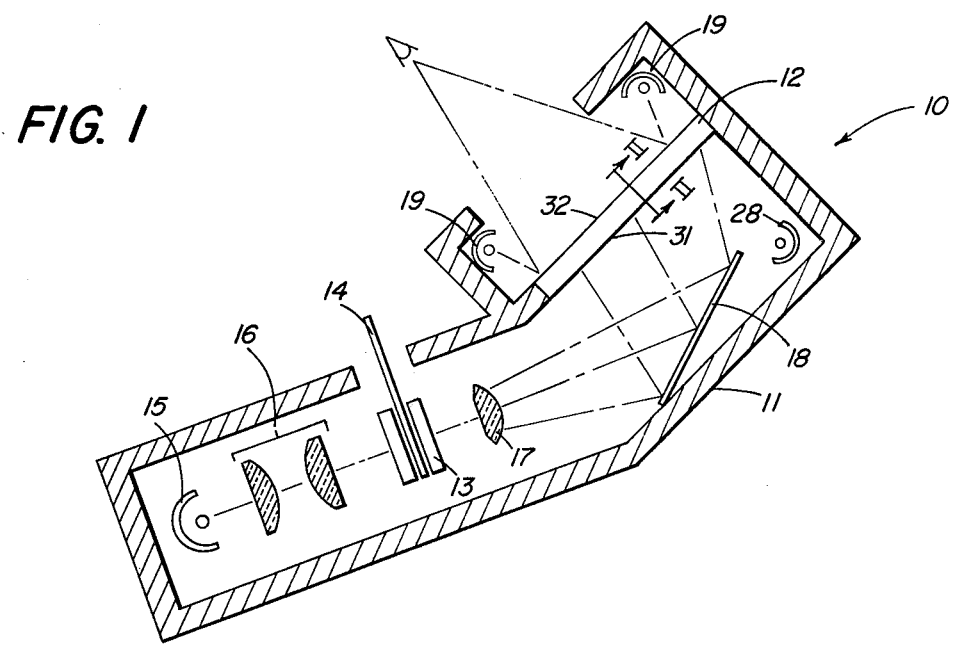
FIG. 1 is a cross-sectional schematic view of one embodiment of a display device in accordance with the present invention.

The display device 10 shown in FIG. 1 includes a housing 11 supporting an electro-optical display panel 12 which separates a substantially light tight image projection section within the housing and a hooded display-illuminating section of the cavity.

Within the image projection section a film gate 13 is provided to removably support an information storage medium 14, e.g., a microfiche and a project lamp 15 which, via a conventional condenser lens 16, directs light through transparency 14 for projection by lens 17 toward reflective mirror 18 and into focus on the rear surface of electro-optical panel 12.

Figure 2:
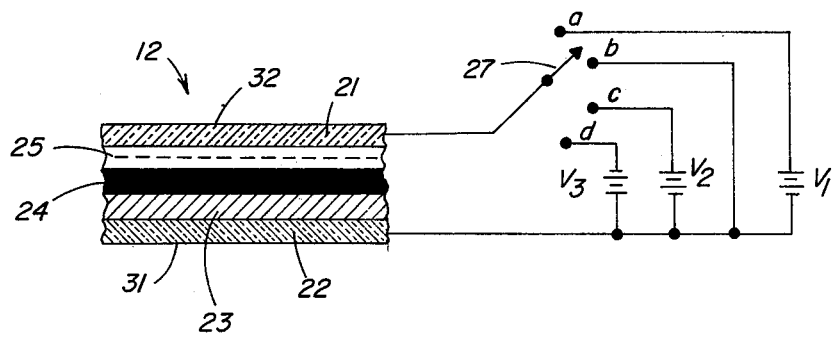
FIG. 2 is an enlarged cross section of the electro-optical element of the device shown in FIG. 1 and its related circuitry.

The panel 12 is shown in schematic cross section in more detail in FIG. 2 and comprises sandwiched between transparent conductive layers 21 and 22, a photoconductive insulative layer 23, an opaque insulative layer 24 and a light control layer 25. The conductive layers can be formed of Nesa glass or a thin evaporated metal coating (e.g., nickel) on a film support. Insulative layer 24 can be a pigmented plastic film or Mylar film with an opaque coating. The photoconductive layer can be an organic or inorganic photoconductive material such as is used in conventional electrophotographic copiers. The light control layer can take various forms but preferably is comprised of a plurality of dipole particles such as fine aluminum flakes in a matrix of an elastomer material such as silicone rubber. Various embodiments of such light control panels are disclosed in substantially greater detail in our copending U.S. application Ser. No. 682,305 entitled "Improved Active Light Control Device", filed concurrently with this application. However, dipole containing dispersions such as, e.g., those disclosed in U.S. Pat. No. 3,512,876 may be utilized instead of the elastomeric light control layer with suitable packaging modifications.

Referring to FIGS. 1 and 2, in operation an image from medium 14 to be displayed on panel 12 is directed via the projector optics and mirror 18 onto the rear surface 31 of panel 12, with switch 27 at the terminal "a" position shown in FIG. 2 so that voltage $V_1$ is applied across the panel 12. The photoconductive layer 23 is thus rendered conductive in areas corresponding to the light portions of the projected image so as to create an electric field across the light control layer 25 in corresponding areas. After exposure, with $V_1$ applied, for about 1 second, switch 27 is moved to the "b" terminal position indicated in FIG. 2 to short the conductive layers 21 and 22 and thereby render the interface between layer 22 and photoconductor 23 at the same potential with the interface between layer 21 and electro-optical layer 25. At this stage a clear reverse image of the projected image can be viewed from the front of the panel in that reflective particles within the elastomer matrix of layer 25 align normal to the viewing surface in areas corresponding to the light exposure of photoconductor 23 and remain parallel to that surface in other, non-exposed, areas. Light directed toward the front of the screen from sources 19 is reflected from the panel where the particles are parallel but passes through the layer 25 and is absorbed in opaque layer 24 where the particles have been oriented by a captured electric field to a position normal to the viewing surface. The image is thus stored on the panel and the projection optics rested while other retrieval operations can be performed with respect to the storage medium.

In certain embodiments it has been noted that acceptable image resolution can be obtained without shorting conductive layers 21 and 22; so that in those embodiments terminal position "b" for switch 27 can be simply an open terminal.

To effect image sense reversal of the captured image switch 27 is moved to the "c" terminal position shown in FIG. 2, applying voltage $V_2$ across the panel. Source $V_2$ is chosen to provide a potential of the same polarity as, but lesser magnitude than, source $V_1$. In the presence of field $V_2$ light control particles of layer 25 change orientations, i.e., parallel oriented particles move normal to the viewing surface and normally oriented particles return to their parallel orientation. Thus a positive image of that on the original media is presented to the viewer. The reverse image sense reproduction can be returned to the screen by moving switch 27 back to the "b" terminal position shorting the conductive layers of the panel. This change of image sense can be effected numerous times by moving switch 27 back and forth between the "b" and "c" terminal positions.

The image stored in element 12 can be erased by moving the switch 27 to the "d" terminal position, applying opposite polarity potential $V_3$ and energizing light source 28 which uniformly floods the surface of the photoconductive layer 23.

It will be appreciated that various useful implementations can be devised by one skilled in the art from the surprising facility of the panel to reverse in image sense in accordance with the novel procedure just described in connection with a particular embodiment.

To further illustrate the remarkable phenomenon the following simplified description is set forth with reference to FIGS. 3A–3D; however it will be understood that the operativeness and scope of invention should not be limited in any way by the theoretical explanations included in the following discussion.

In FIG. 3A an electro-optical display panel 40 is shown comprising a conductive layer 41, light control layer 42 of the type described (reflective dipole flakes in an elastomeric matrix) and an insulative layer 43 (which could correspond to the opaque insulative layer 24 of the embodiment described above). FIG. 3A provides a simplified representation of the first step in the procedure wherein an imagewise electric charge pattern is placed on layer 43 thereby establishing an imagewise electric field pattern across panel 40. The diagram in FIG. 3A illustrates providing such charge by conventional electrostatic image transfer techniques wherein a photoconductor 44 in close proximity to the surface of layer 43 is exposed to a light image with a field applied between conductive layers 45 and 41. It will be appreciated that the initial imagewise electrostatic charge on layer 43 could be achieved by a variety of well known electrographic techniques including, e.g., stylus recording and photoconductive grid or electric aperture controlled charging. Of course, the electric charge and field pattern can be effected by integral photoconductive-conductor layers such as shown in FIG. 2.

FIG. 3B illustrates the step of neutralizing the potential difference between the surface of outer surface of insulative layer 43 and conductive layer 41, which has been found particularly desirable in embodiments in which the photoconductor and its electrode are not integral with the display panel. Upon such neutralization, a distinct imagewise orientation of the particles is effected, whereas prior to this step a somewhat less distinct image was visible as schematically represented in FIG. 3A by the partially oriented particles. We are not certain of the precise physical mechanism within the element which causes the more distinct orientation at this stage; however, we theorize that trapped charges below the original surface charges and at the interface between layer 43 and layer 42 create an interlayer charge differential pattern, and thus an electric field between those zones and the conductive layer 41, in a corresponding imagewise pattern. In FIG. 3B the neutralization is illustrated by supplying positive ions, as through a grid controlled charging device biased to achieve the same potential between the surfaces. A contact shorting of that surface to the conductive layer or other similar technique could also be utilized.

FIG. 3C schematically illustrates the procedure of applying a potential $V_2$, of the same polarity as but lesser magnitude than $V_1$, uniformly across the surface of insulative layer 43 to establish a uniformly superimposed charge, and thus electric field, across the panel and thereby effect an image sense reversal of the reflective particles in layer 42. Again we are not certain of the precise physical mechanism(s) effecting this reversal but theorize that superimposed electric field across the elastomeric layer 42 cancels the previous particle orienting field and simultaneously establishes an orienting field in the previously relaxed regions, causing orientation of particles in those areas to a light passing position.

FIG. 3D illustrates that the orientation of the particles can be restored to the original imagewise state by again neutralizing the potential difference between the conductive layer 41 and the outer surface of insulative layer 43.

Erasure of the image can be effected by applying uniformly to the surface of the insulative layer 41 a charge of opposite polarity to the original image forming charge $V_1$, followed by eliminating the differential potential between the insulative layer outer surface and the conductive layer 41 in one of the manners described with respect to FIG. 3B.

The relative magnitudes of the voltages applied will depend on the particular materials utilized and construction of the panel; however example voltage levels for particular panels are described below.

Having now described a simplified embodiment of the present invention, the following more specific description of working Examples will provide further explanation of its possible implementations.

EXAMPLE 1

An electro-optical light control layer was made by superimposing multiple coatings on the same conducting support. Specifically, the coatings comprised an elastomer-aluminum flake dispersion coated on one layer of the elastomer only and then overcoated with another layer of elastomer only. The aluminum flake dispersion was composed of:

10 g Silicone resin (RTV 619A) General Electric Co.
0.8 g Hardener (RTV 619B) General Electric Co.
0.2 g Aluminum leaf (Cres-lite No. 200) Crescent Bronze Co.

The silicone resin and aluminum flakes were mixed together with an ultrasonic generator probe for about 10 minutes. Then the hardener was hand stirred into the dispersion. The outer elastomer layers contain the same ratio of silicone resin and hardener, but no aluminum flakes. The multiple-coating element was made by first coating a 0.002 inch layer of the elastomer with a 0.002 inch doctor blade onto the surface of a 0.004 inch poly(ethylene terephthalate) support that had a sublimed conducting layer of Cr and SiO. Next, using a 0.004 inch doctor blade, the aluminum flake dispersion was coated, 0.002 inch in thickness, over the first elastomer layer. Finally, a 0.006 inch doctor blade was employed to coat another 0.002 inch elastomer layer, like the first one, over the flake dispersion layer. The multilayer structure was cured at 140° F for 1 hour followed by an overnight cure at room temperature, then at 140° F for an additional 4 hours.

A photoconductor layer carried on a transparent conductive support was placed over the electro-optical layer and exposed simultaneously with voltage and a pattern of light, as described with respect to FIG. 3A. The photoconductor layer consisted of a 20 micron aggregate photoconductor coated on an Estar film support containing a Cr:SiO cermet conducting layer having an optical density of 0.1. The exposure was made by placing a Kodalith original next to the support side of the photoconductor layer to modulate the room lights (about 30 fc) impinging on the photoconductor for about 1 second. The separation of the photoconductor layer and electro-optical layer was made with the voltage of about 1.8 kilovolts applied so as to form a negative polarity electrostatic image on the insulative layer. A negative appearing image was observed on the electro-optical layer after discharging it uniformly to zero potential by means of a grid controlled corona charger.

The reproduction sense of the image could be changed to a positive by uniformly charging the insulative layer of electro-optical layer with the same polarity voltage, i.e., negative, but reduced in magnitude to 0.9 kilovolts. The reproduction sense could be changed back and forth at will by alternately charging the surface of the layer to zero or the negative 0.9 kilovolt potential. Four such reproduction changes were made with a single, optically addressed image over a one-hour period. The image was faded after this time, but still distinguishable. The image was erased by applying a reverse 3 KV voltage across the electro-optical layer (i.e., positive on the surface of the insulative layer) followed by reducing the surface voltage to zero.

EXAMPLE 2

An image was formed on an electro-optical layer like in Example 1, except a PbO photoconductor and x-ray irradiation were used. The PbO layer was 100 microns thick and consisted of the PbO pigment dispersed in a binder. A voltage of 3.2 KV was applied across the two layers with the photoconductor's electrode connected to the negative terminal while being exposed to x-rays. The exposure was for 6 seconds with 60 KVP x-rays at a distance of 1 foot and filtered with 1 mm of aluminum. This resulting negative image could be reversed to a direct positive by uniformly charging the electro-optical surface layer to a negative 1.2 KV.

After erasing this image, as explained in Example 1, another image was formed by exposing the photoconductor simultaneously to x-rays and voltage as before, but for only 2 seconds followed by a continuation of the voltage only, for an additional 15 seconds. This image resembled the previous one. A 2-second exposure with no voltage continuation revealed only a barely detectable image.

EXAMPLE 3

A direct positive image, with zero surface charge, was made in a manner similar to Example 1, except a precharging step was necessary. The precharge of the electro-optical layer was accomplished by sandwiching it with the 20 micron organic photoconductive layer of Example 1 and uniformly light flooding it while 3KV was applied across the two layers. The photoconductor electrode optical layer was reduced to zero. The electro-optical layer appeared uniformly black at this time. The photoconductor was again sandwiched with the electro-optical layer and imagewise exposed as in the first step of Example 1, except 1.2 KV was applied. After separation and reduction of the surface charge to zero, a direct positive image was evident. The image could be reversed in reproduction sense by applying a uniform positive charge to the surface of the electro-optical layer with a grid controlled corona charger. The control grid was adjusted to 1.2KV. The reproduction sense could be changed at will by alternating between zero and positive surface charge.

EXAMPLE 4

The surface of an electro-optical layer like in Example 1 was sprayed with a print matte lacquer (Getzol Type C, Getzol Products Corp.) to reduce the specular reflections. An image was made as in Example 1 which was detectable even after 5 days.

EXAMPLE 5

A plastic credit card was sprayed with a conducting paint and the raised letters were put into light contact with the electro-optical layer of Example 1 while a 2.5 KV voltage was put between it and the electrode of the electro-optical layer. The contact time was less than 1 second. An image of black characters, corresponding to the raised letter, on a white background was observed after removal of the credit card. A similar image was formed by inserting the electro-optical layer into a typewriter in place of the paper and applying a 2.5 KV voltage while the key was in light contact with the layer.

The above images had all the characteristics of the ones in the previous examples such as storage, erasure on command, and reproduction sense changes.

EXAMPLE 6

An integral photoconductor-electrooptical element was made similar to the one described in Example 1, except a 0.005 inch Mylar film was used in place of the opaque, optical barrier layer. The cross section of the integral element would be identical to that shown in FIG. 3A, except no air gap exists and the opaque layer on the back side of the electro-optical layer was eliminated. The resulting image was viewed through this side of the multilayer.

The image forming steps consisted of simultaneously applying a voltage of 3 KV and exposing as shown in step 1 of Example 1 for 1 second followed by connecting the two electrodes together. The negative image appeared. The image could also be reversed in sense by applying the same polarity voltage, but reduced in magnitude (about 1.2 KV). The image was erased by applying an opposite voltage of about 1 KV while light-flooding the photoconductor.

The invention has been described in detail with particular reference to certain preferred embodiments thereof, but it will be understood that variations and modifications can be effected within the spirit and scope of the invention.

What is claimed is:

1. An improved viewing device comprising:
    a. an electro-optical display panel including means for receiving and storing an electric field pattern corresponding to an image to be viewed and means, responsive to such a received pattern, for modulating incident light in accordance with such pattern;
    b. imaging means for applying an imagewise electric field pattern across said display panel thereby establishing in said panel a light modulating pattern corresponding to said field pattern in a first image sense; and
    c. reversing means for selectively impressing a uniform electric field across said panel with the imagewise field pattern stored therein, said uniform field being of the same polarity as said field pattern and of magnitude sufficient to reverse said first modulating pattern to a second light modulating pattern corresponding to said field pattern in an image sense opposite to said first modulating pattern.

2. The invention as defined in claim 1 wherein said display panel includes a light-modulating layer and a photoconductive layer, both sandwiched between transparent electrodes, and wherein said imaging means includes means for exposing a light image onto said photoconductive layer and means for applying a voltage of first magnitude and first polarity across said electrodes during exposure of such light image.

3. The invention as defined in claim 2 wherein said reversing means provides a voltage of the same polarity as, but of magnitude less than, said first voltage.

4. The invention as defined in claim 2 further including erasing means for uniformly illuminating said photoconductive layer and applying a field of polarity opposite to said first polarity across said electrodes.

5. The invention as defined in claim 1 wherein said display panel includes an elastomeric matrix supporting a plurality of dipole light controlling particles.

6. The invention as defined in claim 1 further including means for establishing across said panel a uniform electric field of the same polarity as said imagewise field, prior to application of said imagewise field so that a positive format modulating pattern is subsequently effected by said imaging means.

7. The invention as defined in claim 1 wherein said display panel includes a light-modulating layer and an electrically insulating layer contiguous said modulating layer.

8. The invention as defined in claim 1 wherein said imaging means comprises means for creating an imagewise pattern of charge differentials across the contiguous surfaces of said insulating and light-modulating layers.

9. The invention as defined in claim 8 wherein said imaging means comprises means for creating an electric charge pattern on the surface of said insulative layer opposite said light-modulating layer and means for subsequently neutralizing such charge pattern.

10. The invention as defined in claim 9 wherein said reversing means includes means for creating a uniform electric charge on said opposite surface of said insulating layer.

11. The invention as defined in claim 10 including means for neutralizing said uniform charge to effect reversion of the second image modulating pattern to the first image modulating pattern.

12. Improved apparatus for selectively displaying an image in positive or negative formats, said apparatus comprising:
    a. a recording and display panel including:
        1. a light-modulating layer comprising a transparent, electrically insulative matrix and a plurality of light-controlling, dipole particles dispersed uniformly across, and supported by, said matrix in a manner allowing particle movement in the presence of an electric field;
        2. an electrically insulative layer contiguous said modulating layer; and
        3. a photoconductor layer contiguous said insulative layer
        4. first and second transparent, electrically conductive layers sandwiching said modulating photoconductor and insulative layers;
    b. means for applying a first electrical potential, of a first magnitude and first polarity, across said electrically conductive layers;
    c. means for exposing said photoconductor layer to an image pattern of radiation to which it is sensitive, during application of said first potential, so as to store a corresponding electric field pattern across said insulative and light control layers; and
    d. means for selectively adjusting said conductive layers between a first condition in which the charge difference of said conductive layers is substantially eliminated, thereby providing a negative format light modulating pattern in said light-modulating layer, and a second condition in which the charge difference applied to said conductive layers is of said first polarity but of magnitude sufficiently below said first magnitude to provide a positive format light-modulating pattern in said light-modulating layer.

13. The invention as defined in claim 12 further including means for erasing a stored electric field pattern including:
    1. means for applying across said conductive layers, an erase potential of polarity opposite said first polarity; and
    2. means for uniformly illuminating said photoconductor layer during application of said erase potential.

14. The invention as defined in claim 12 wherein said matrix of said light-modulating layer comprises an elastomer.

15. Improved display apparatus having an image sense reversal capability, said apparatus comprising:
    a. an image storage and display panel including:

1. a light control layer having a matrix and plurality of field-orientable, light-control particles movably supported by said matrix; and
2. an electrically insulative layer contiguous said light control layer;

b. imaging means for establishing an inter-layer charge differential pattern across the contiguous surfaces of said insulative and light-control layers, said charge differential pattern being of magnitude sufficient to field-orient said particles in a first light-modulating pattern corresponding to said charge differential pattern in a first image sense;

c. means for selectively applying and removing, across said panel in superimposition on said charge differential pattern, a uniform electric field of predetermined magnitude sufficient to effect reorientation of said particles in a second light-modulating pattern which is the reverse in image sense of said first light-modulating pattern.

16. The invention as defined in claim 15 wherein said imaging means includes means for providing across said panel, an imagewise electric field of magnitude greater than said predetermined magnitude.

17. The invention as defined in claim 15 wherein said matrix comprises an elastomeric material.

18. The invention as defined in claim 15 further including means for erasing inter-layer charge differential pattern from said panel comprising means for applying a field of opposite polarity from said uniform electric field.

19. Information display apparatus comprising:
a. an image display panel including:
 1. an electrically insulative layer;
 2. an electrically conductive layer; and
 3. an active display layer located between said conductive and insulative layers and comprising a substantially transparent, electrically insulative matrix medium and a plurality of minute, dipolar, light control particles dispersed across an operative area of said display layer;

b. means for establishing an electric charge pattern of a first polarity and magnitude across a portion of said insulative layer overlying said operative area of said display layer to provide a first image display corresponding to said electric charge pattern; and c. means for uniformly electrically charging the surface of said dielectric layer with a charge of said first polarity, but of magnitude lower than said first magnitude, to provide a second image display corresponding to said imagewise charge pattern but of reverse reproduction sense from said first image display.

20. An improved method for selectively displaying an image in positive and negative reproduction sense, said method comprising:
a. providing a display panel having:
 1. an electrically insulative layer; and
 2. a light-modulating layer including a plurality of dipole light control particles movably supported in a transparent matrix;

b. establishing an imagewise electric field pattern of first magnitude and polarity across said panel; and c. selectively applying and removing a superimposed uniform electric field, of said first polarity and lesser magnitude than said first magnitude, across said panel.

21. The invention as defined in claim 20 further including the step of establishing a uniform field of said first polarity across said panel prior to establishing said imagewise electric field pattern.

* * * * *